United States Patent [19]

Shenk

[11] 4,199,244
[45] Apr. 22, 1980

[54] AUTOMATIC FOCUSING CAMERA

[75] Inventor: Edwin K. Shenk, Westford, Mass.

[73] Assignee: Polaroid Corporation, Cambridge, Mass.

[21] Appl. No.: 916,114

[22] Filed: Jun. 16, 1978

Related U.S. Application Data

[63] Continuation of Ser. No. 729,289, Oct. 4, 1976, abandoned.

[51] Int. Cl.² .............................................. G03B 3/00
[52] U.S. Cl. ..................................... 354/195; 354/25; 352/140
[58] Field of Search ................. 354/25, 195; 352/140; 340/1 R, 221

[56] References Cited

U.S. PATENT DOCUMENTS

| | | | |
|---|---|---|---|
| 3,522,764 | 8/1970 | Riber et al. | 354/195 |
| 3,836,919 | 9/1974 | Matsumoto et al. | 354/25 |
| 3,896,457 | 7/1975 | Yamanishi et al. | 354/25 |
| 3,999,192 | 12/1976 | Hosoe et al. | 354/25 |
| 4,078,171 | 3/1978 | Stauffer | 354/25 |
| 4,103,309 | 7/1978 | Massa | 354/195 |

FOREIGN PATENT DOCUMENTS

864048 1/1953 Fed. Rep. of Germany ............ 354/195

*Primary Examiner*—Russel E. Adams
*Attorney, Agent, or Firm*—David R. Thornton

[57] ABSTRACT

A focusing mechanism for a camera includes a drive arrangement for displacing the camera lens in accordance with the contents of a counter into which the output of a pulse generator is gated during a range pulse whose duration is directly related to the distance of a subject from the camera. The pulse generator is programmed so that its pulse repetition rate matches the time-derivative of the function relating the subject distance to the lens position at which a subject is in focus. Integration of the generator output is carried out by gating the generator pulses into a counter during the range pulse such that at the trailing edge of the range pulse, the contents of the counter will be the integral of the time-derivative evaluated between the limits of the range pulse, i.e., a definite integral representative of the lens position at which a subject will be in focus when located at a distance defined by the duration of the range pulse. For fully automated operation as applied to a still camera, shutter actuation can be in response to arrival of the lens to the position at which the subject is in focus. Applied to movie cameras, the lens can track a moving subject maintaning it in focus during filming.

31 Claims, 19 Drawing Figures

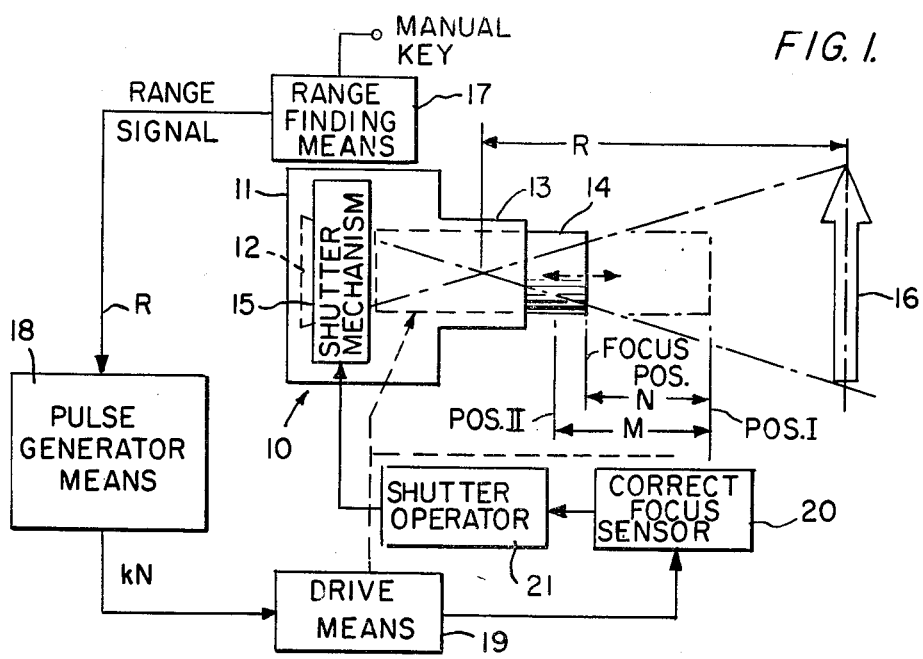

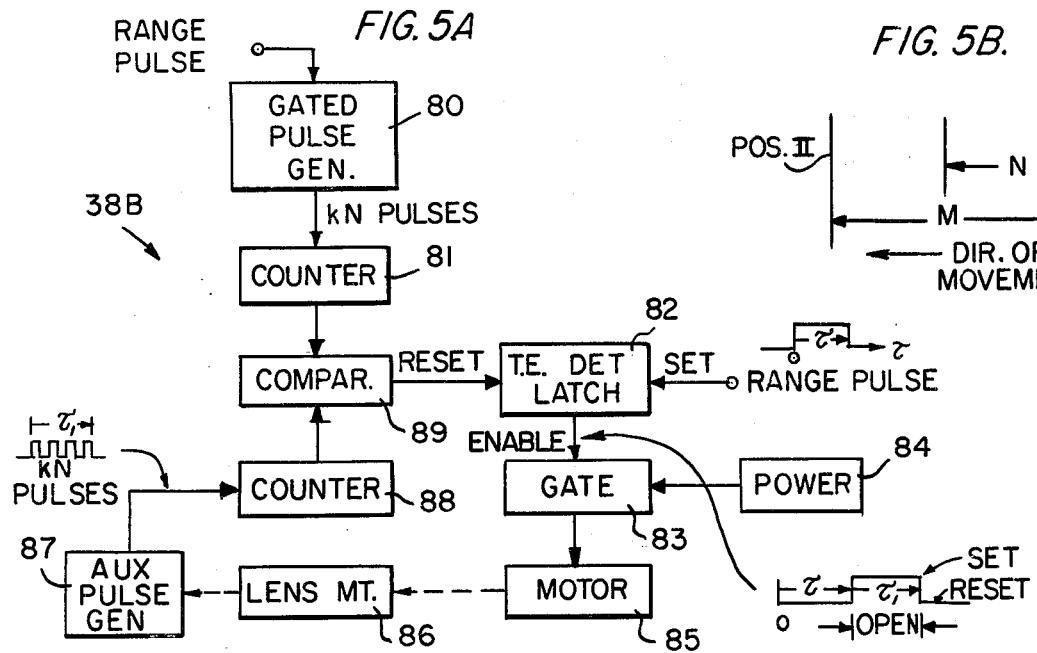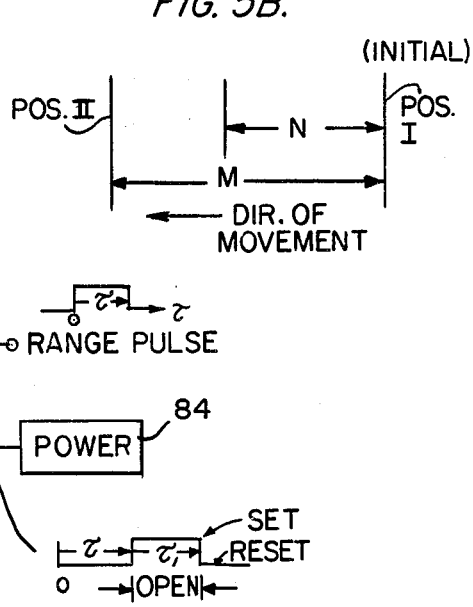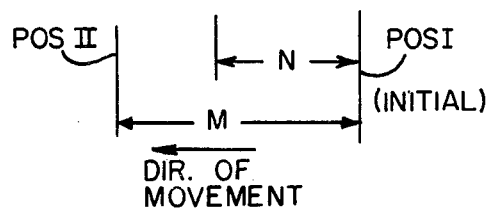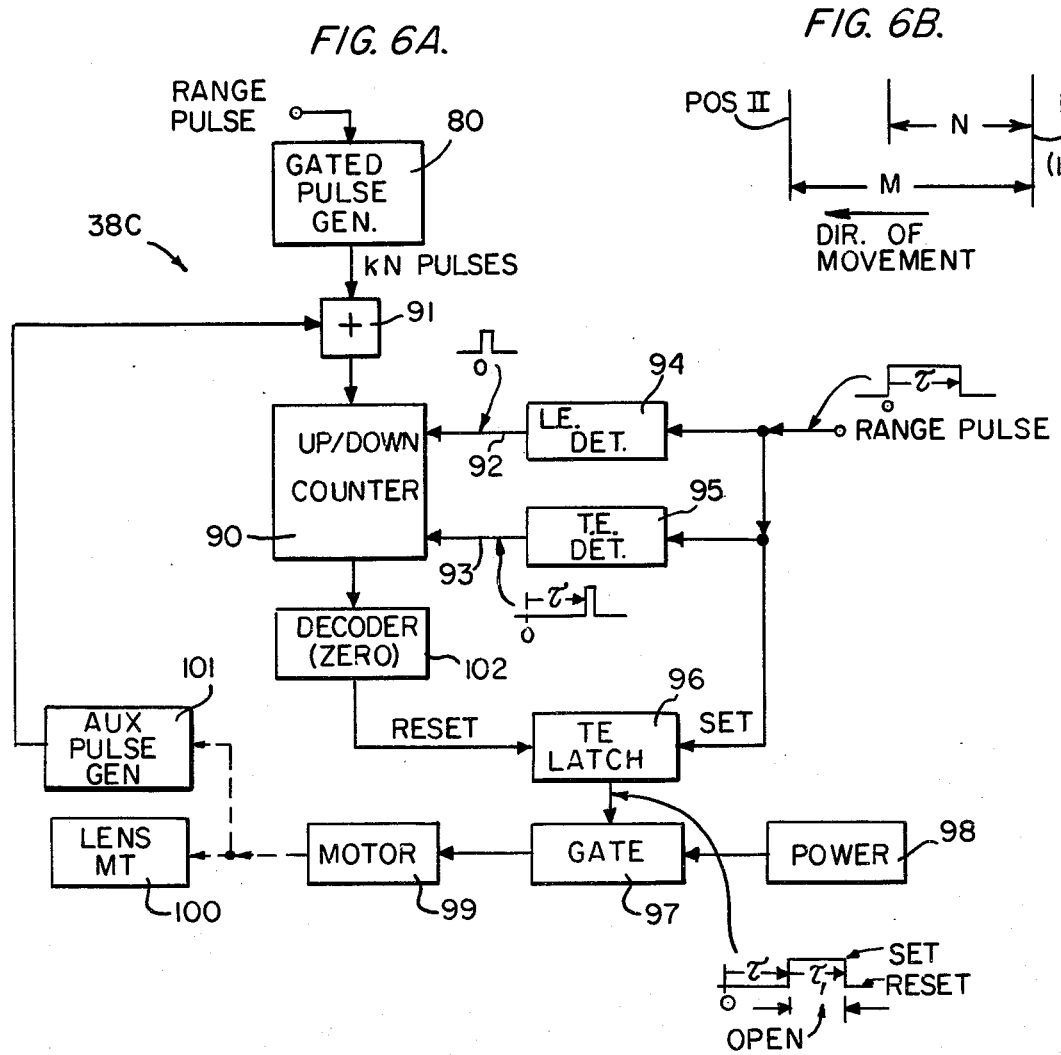

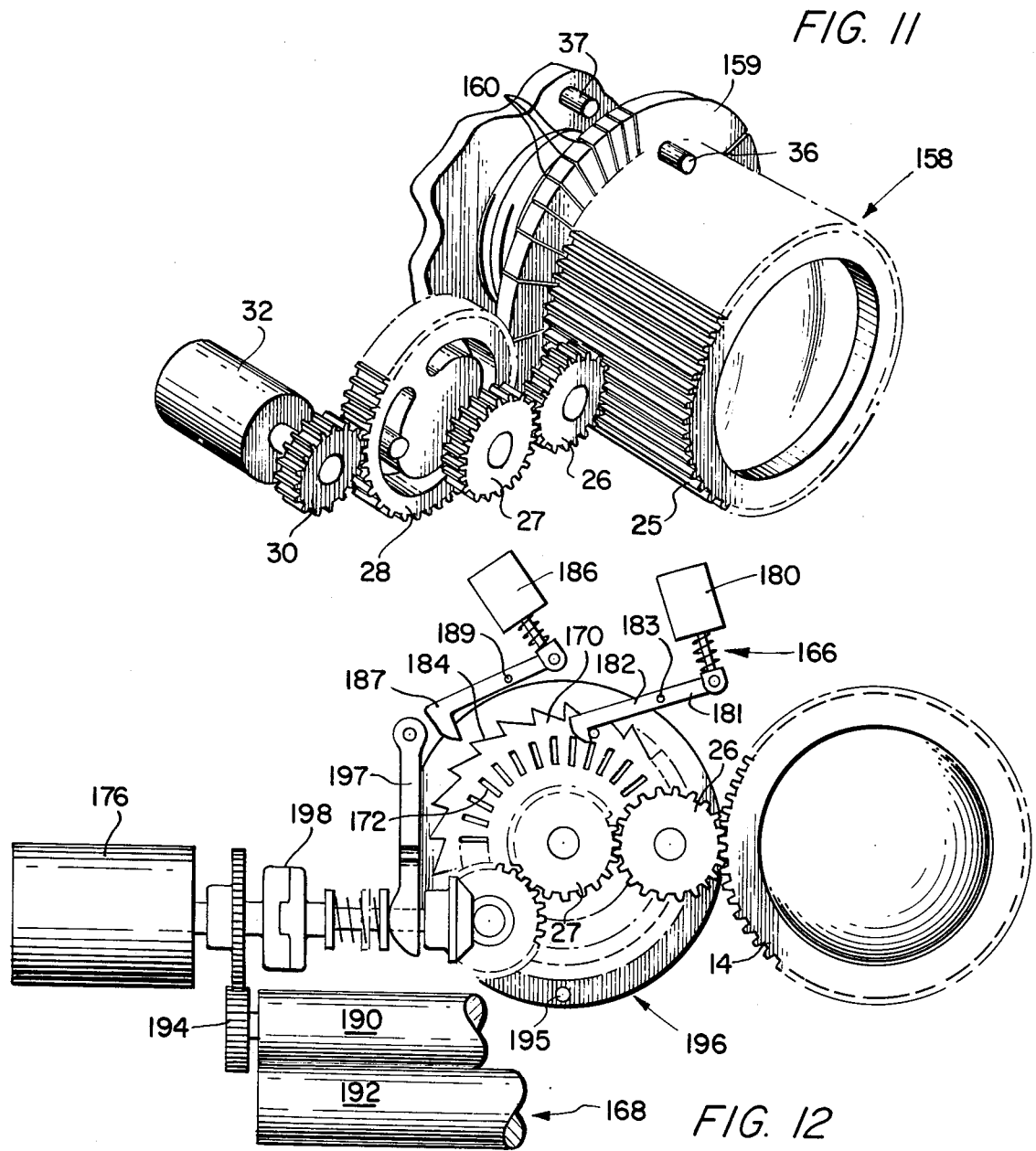

AUTOMATIC FOCUSING CAMERA

This is a continuation of application Ser. No. 729,289, filed Oct. 4, 1976 now abandoned.

BACKGROUND OF THE INVENTION

This invention relates to a power-operated focusing mechanism for a camera, and to an automatic focusing camera utilizing such mechanism.

Before photographing a subject, the lens of a variable lens camera must be axially displaced to a position at which the subject is brought into focus; this axial position being a function of the distance of the subject to the camera lens. While such function, hereinafter termed the lens/subject function, depends on many parameters associated with the optical system, one of its more important characteristics for purposes of the present discussion is its highly non-linear nature. In general, the slope of this function is greatest for close subjects and decreases assymtotically to zero for objects remote from the camera.

In order to properly set the axial position of the lens, it is conventional to mechanically couple the output arm of an optical range finder to the lens mount through a cam system into which the lens/subject function has been incorporated whereby operation of the range finder imparts proper displacement to the lens. In a different approach to powered displacement of the lens mount, the lens/subject function may be generated electrically. An example of the latter arrangement is illustrated in U.S. Pat. No. 3,522,764 which discloses an arrangement in which the setting of the lens is related to an acoustic range finder that produces a range pulse whose duration is directly related to the distance of the subject to the lens. The range pulse is used to control a power-operated focus mechanism that moves the lens to an axial position in which the subject will be in focus. The lens/subject function in this patent is developed in an analogous manner by a highly non-linear potentiometer which while generally satisfactory, can be expensive to manufacture and is not easily adapted to different lens systems since a different potentiometer has to be used with each different lens mount arrangement. As a consequence, a power-operated focus mechanism based on this principal of operation lacks a degree of flexibility.

It is therefore an object of the present invention to provide an improved power-operated focus mechanism.

Another object is to provide an economical power driven focus mechanism for a photographic camera.

A further object is to provide an automatic focusing camera.

A still further object is to provide an improved method of determining a lens position in accordance with subject distance.

Still another object is to provide a method of electrically generating a lens position responsive to subject distance ranging.

A further object is to provide a new and improved power-operated focus mechanism for a camera which eliminates analog computational components and techniques, and employs, instead, more versatile digital components for developing an arbitrary lens/subject function.

SUMMARY OF THE INVENTION

According to the present invention, a range signal representing the subject distance controls a gated pulse generator means in a non-linear manner such that the latter produces a train of pulses whose number is representative of the axial position of a lens mount at which the subject will be in focus, and the apparatus includes a focusing mechanism having means, responsive to the pulses produced by the pulse generator means, for displacing the lens mount to the proper axial position.

Preferably, the range signal provides a timed duration, or a length-modulated range pulse whose duration is linearly related to subject distance by a fixed scaling factor. The non-linear relationship between the length of the range pulse and the number of pulses produced by the pulse generator means is established by pre-programming the pulse repetition frequency of the latter. Specifically, the program causes the pulse repetition frequency to vary with time in the same manner as the time-derivative of at least a close approximation of the lens/subject function, which function is parametrically related to time by reason of the scaling factor associated with generation of the range pulse. The output of the pulse generator means, which is representative of the time-derivative of the lens/subject function, is integrated by gating the pulses into a counter through a gate controlled by the range pulse whose duration sets the limts of integration. The contents of the counter at any instant represents the integral of the time-derivative of the lens/subject function evaluated from time equals zero (the leading edge of the range pulse) to that instant. Thus, the contents of the counter at the trailing edge of the range pulse is the definite integral of the time-derivative of the approximate lens/subject function, namely the axial position of the lens mount for a subject whose distance is determined by the duration of the range pulse.

The program for varying the pulse repetition frequency of the pulse generator means is established by a clock driving a pre-programmed divider allowing the pulse generator means to produce a train of pulses whose variation in repetition frequency changes with time in accordance with the time-derivative of any piece-wise linear approximation of the lens/subject function. In an alternative arrangement where an exponential approximates a lens/subject function, the focus mechanism may include a voltage controlled oscillator whose pulse repetition frequency is varied by a voltage derived by differentiating a step function input; the parameters of the differentiating circuit being such that the voltage applied to the oscillator approximates the time-derivative of the lens/subject function.

The invention also consists in an automatic focusing snapshot or movie camera utilizing the focusing mechanism described above. Such camera may include an acoustic transponder whose triggering may initiate the range pulse, the trailing edge of which is established by receipt of an echo from the subject to be photographed. In a snapshot camera, the focusing mechanism may be effective to initiate shutter operation in response to movement of the lens mount to a position at which the subject is in focus. When incorporated into a movie camera, the focusing mechanism is effective to continuously update the position of the lens mount while the subject is being filmed, updating occuring periodically in response to movement of the lens mount to a position at which the subject had been in focus when last interrogated.

BRIEF DESCRIPTION OF THE DRAWINGS

Embodiments of the invention are illustrated in the accompanying drawings wherein:

FIG. 1 is a diagrammatic illustration partly in block diagram form of an automatic focusing snapshot camera according to the present invention;

FIG. 2A is a block diagram of the power-operated focusing mechanism including a lens mount employed in the camera of FIG. 1;

FIG. 2B is a displacement diagram showing the limits of movement of the lens mount of FIG. 2A;

FIG. 5A is a simplified block diagram of another embodiment of a power-operated focusing mechanism suitable for use in the camera of FIG. 1

FIG. 5B is a displacement diagram showing the limits of movement of the lens mount of FIG. 5A;

FIG. 6A is a further embodiment of a power-operated focusing mechanism according to the present invention;

FIG. 6B is a displacement diagram showing the limits of movement of the lens mount of FIG. 6A.

FIG. 11 is a perspective view of an alternate embodiment of a lens drive arrangement for use in the novel camera of FIG. 1;

FIG. 12 is another alternate embodiment of a lens drive arrangement in accordance with the invention;

DESCRIPTION OF PREFERRED EMBODIMENTS

Figure 3:
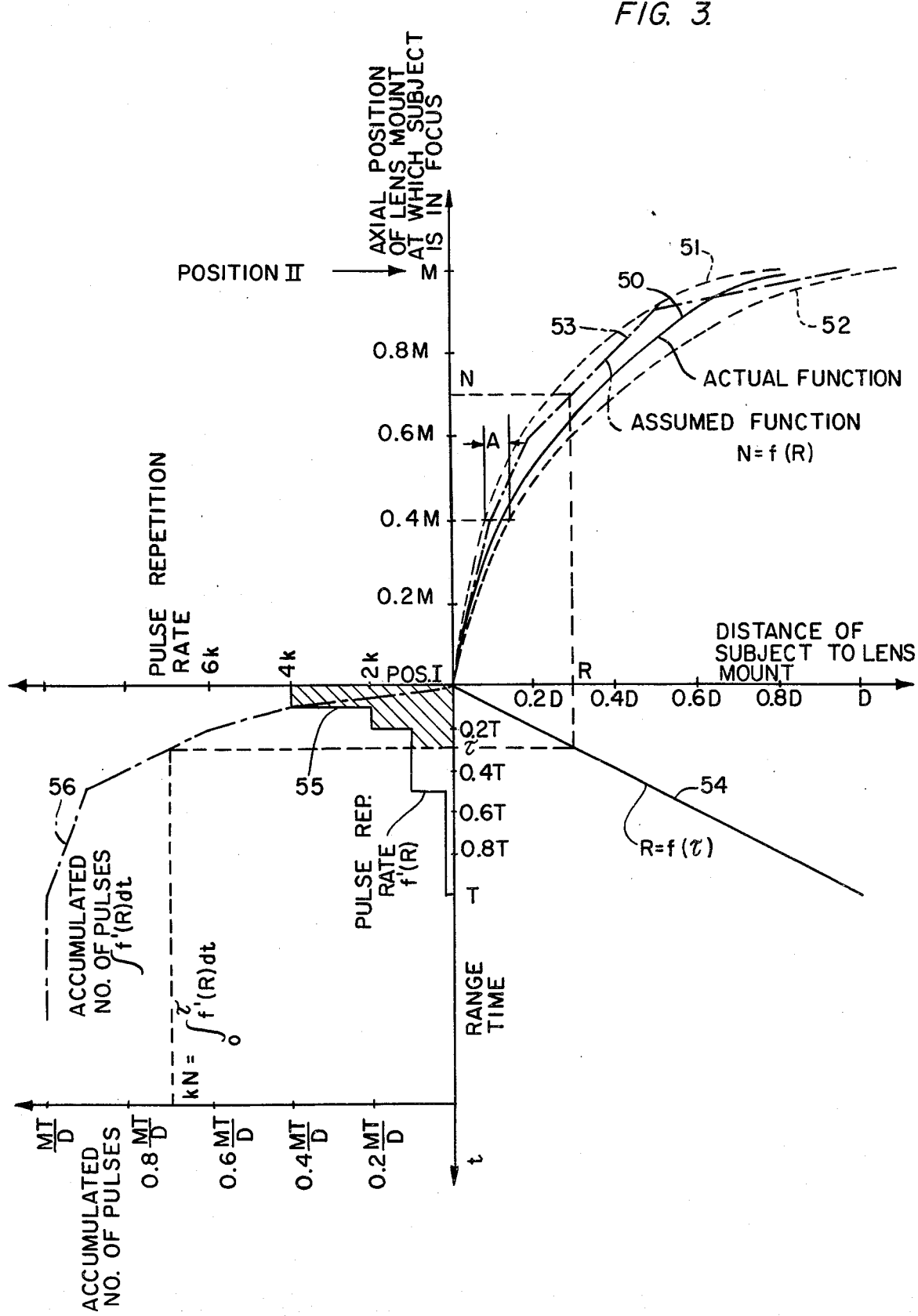
FIG. 3 is a composite graph showing in the first guadrant a typical lens/subject function of the camera of FIG. 1, a typical range-time function in the fourth quadrant, and both the time-derivative of the lens/subject function and its indefinite integral in the third quadrant.

Referring now to FIG. 1, reference numeral 10 designates, in schematic form, an automatic focusing snapshot camera according to the present invention. Camera 10 includes housing 11 within which film is supported at a focal plane 12 opposite hub 13 within which a lens assembly or lens mount 14 is axially displaceable through a distance M between terminal position I and terminal position II. Interposed between lens mount 14 and film 12 is shutter 15 for controlling the exposure of film 12. Preferably, shutter mechanism 15 determines exposure time and aperture size in accordance with the light from the scene being photographed. The distance N of the lens mount from terminal position I to a location, at which subject 16 at a range R from the camera is in focus, in a predetermined function of the range, such function being highly non-linear and being termed the lens/subject function.

Associated with the camera is a range finding means 17 which, when keyed into operation, produces a range signal or range parameter having a characteristic directly proportional to the distance R. The range signal is applied to a pulse generator means 18 which converts the range signal to a lens parameter by generating a train of pulses whose number is representative of the axial position of the lens mount at which a subject at a distance R will be in focus. Drive means 19, operatively associated with the lens mount, axially displaces the same in accordance with the total number of pulses applied thereby by the pulse generator means. If 1/k is the specific displacement of the lens mount, i.e., the displacement per pulse applied to drive means 19, the application to the drive means of kN pulses will displace the lens mount from position I to a position located at a distance N from position I. If the lens mount is located at position II, k(M-N) pulses applied to the drive means will displace the lens mount to its proper axial position.

When the lens mount 14 reaches its final position or that is, a proper axial position to focus subject 16 on film 12, a correct focus sensor 20 produces a signal which is applied to shutter operator 21 and the latter responds by actuating shutter mechanism 15. The result is the proper exposure of film 12 to a properly focused subject 16, with the only manual input being the keying of the range finding means.

Figure 9:
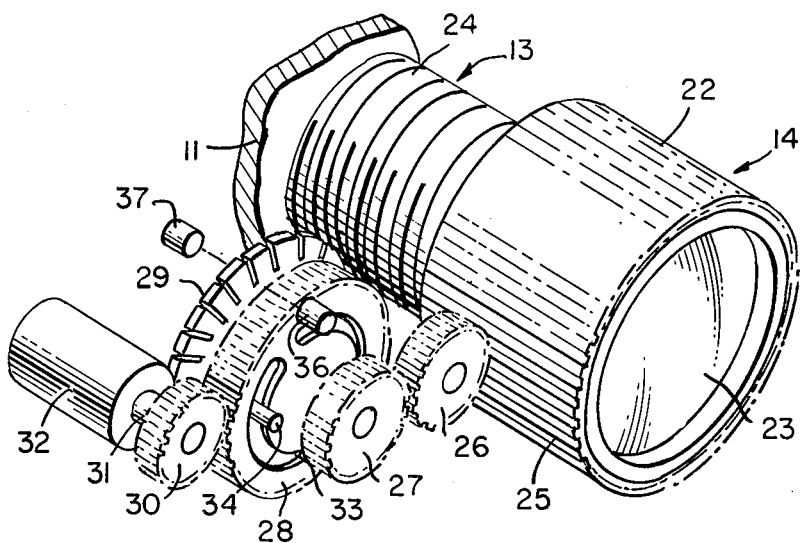
FIG. 9 is a perspective view of one embodiment of drive means for a lens mount.

A mechanical connection employed between hub 13 and lens mount 14 is entirely conventional and may take the form shown in FIG. 9 to which reference is now made. Lens mount 14 may include an internally threaded sleeve 22 carrying the objective lens 23 of the camera. Sleeve 22 is mounted on an externally threaded sleeve 24 that is fixed to camera housing 11 so that axial displacement of sleeve 22 occurs in response to rotation of the sleeve. The outer cylindrical surface of sleeve 22 is provided with teeth 25 mating with a spur gear 26 rotatably mounted on the housing 11 of the camera. Gear 26 mates with a corresponding gear 27 rotatably mounted on the housing 11. Rigidly connected to gear 27 for rotation therewith, are a drive gear 28 and a peripherally slotted disc 29. Gear 28 meshes with a pinion 30 connected to the output shaft 31 of a stepping motor 32. When the motor 32 is enabled, the rotation of pinion 30 is transmitted through gears 28, 27 and 26 to the sleeve 22 which upon rotation thereby is displaced axially in one direction or the other depending on the direction of rotation of the motor. The teeth 25 on sleeve 22 extend from one axial end of the sleeve to the other in order to permit the axial displacement of the sleeve despite the confinement of spur gear 26 against axial movement.

In order to limit the axial displacement of lens mount 14 in either direction, stops are provided and a slip clutch arrangement is utilized (not shown) between motor 32 and gear 26. Usually, the lens mount rotates through less than 360° in axially moving from a first position (i.e., position I) at which a subject in focus may be as close as 10 inches, to a second position (i.e., position II) at which a subject in focus may be 30 or more feet from the camera. By a proper selection of gear ratios, the drive gear 28 may rotate through the same angular displacement as the sleeve 22; and in such case, the stops can be associated with this gear. For example, an interrupted slot 33 may be provided in an axial face of gear 28, for cooperation with a stop pin 34 rigidly mounted on the camera housing. The engagement of this pin with the closed ends of slot 33 will limit displacement of the lens mount to locations between positions I and II shown in FIG. 1.

As will be described in detail below, the slotted disc 29 is part of an auxiliary pulse generator 35 (shown in FIG. 2A) and is associated with the lens drive or lens mount 14 for the purpose of providing feedback information necessary to properly position the lens mount. Hence, the generator 35 provide means for sensing the position of the lens 14, or more specifically, for indicating the displacement of the lens from its start position which in the preferred embodiment is set at or just beyond the infinity position. Preferably, auxiliary pulse generator 35 (see FIG. 2A), includes a fixed light source 36 (FIG. 9), which may be a light emitting diode, and a fixed photocell 37. Source 36 and cell 37 are positioned in alignment on opposite sides of the slotted disc 29 so that light from the source incident on the photocell is periodically interrupted by the rotation of disc 29. The threaded connection between sleeves 22 and 24, between the teeth on sleeve 22 and teeth on gears 26 and 27, and between the number of slots and the parameters just described, define the specific displacement of the lens mount in terms of its axial displacement per pulse produced by the auxiliary pulse generator. As indicated above, the specific displacement is termed 1/k. Other lens sensing arrangements will also be suitable, for example, the light pulsing system noted above may be replaced by a magnetic system or a mechanical switch, etc.

Turning now to FIG. 2A, the preferred form of the power-operated focusing mechanism is shown in simplified form and is designated by reference numeral 38. In this embodiment, the range signal is a pulse whose duration or length $\tau$ is proportional to the distance to the subject being photographed as determined by range finding means 17. The range finding means can be optical, in which case the output of its movable arm could drive a linear potentiometer whose resistance could determine a range pulse proportional to subject distance. Preferably, the range finding means is an acoustic transponder of the type shown in Patent No. 3,522,764, or as shown in copending application Serial No. 729,392 filed on even date herewith in the same of Juerg Muggli. In either event, $\tau$ is a function of the range R of the subject.

Pulse generator means 18 of the focusing mechanism 38 includes a pulse generator 39 having a programmed time-variable pulse repetition frequency, and a gate 40, responsive to the duration of the range pulse for gating the output of pulse generator 39 into a counter 41 via an OR-gate 42. The counter 41, together with a decoder 43, are a part of the drive means 19 of the mechanism which also includes, in addition to motor 32 a lens pulse generator or auxiliary pulse generator 35 which operates as a lens position indicator and a power input 44 which can be applied to motor 32 by a gate 45 when the latter is enabled by a latch 46.

The state of the power focusing mechanism 38 before a range pulse is applied to the input terminal is as follows: pulse generator 38 is dormant, counter 41 is cleared, gate 45 is disabled (in a non-conductive state) and the lens mount is in its initial position (i.e., position II) which would correspond to its position for focusing on a subject at infinity. Since the lens mount is stationary, there is no output from auxiliary pulse generator 35.

In operation, the leading edge of the range pulse is detected at 47 triggering pulse generator 39 into operation and enabling gate 40. The repetition rate of this pulse generator is programmed such that it produces kN pulses during the time interval $\tau$, which pulses are accumulated in counter 41. That is to say, counter 41, at the end of the range pulse, contains a number of representative of the axial position of the lens mount at which the subject will be in focus.

Latch 46 is set by the trailing end of the range pulse thereby opening or enabling gate 45 that is, rendering gate 45 conductive or transmissive and causing motor 32 to rotate thereby axially displacing lens mount 14. Auxiliary pulse generator 35 is activated simultaneously with displacement of the lens mount, and begins to supply pulses to counter 41 through OR-gate 42.

As motor 32 moves lens mount 14 from its position II towards position I, counter 41 accumulates pulses produced by the auxiliary pulse generator 35. When k(M-N) pulses have been produced, the contents of counter 41 will be the number kM, and output pulse 48 is produced by the decoder. Pulse 48 resets latch 46 disabling (closing) gate 45 and turning off motor 32. No further pulses are produced by the auxiliary pulse generator, and lens mount 14 will now be located a distance N from position I since the auxiliary pulse generator will have produced k(M-N) pulses in the time interval $\tau$ during which latch 46 was set. The object at range R, producing the range pulse, will be in proper focus upon occurrence of the reset pulse 48. This reset pulse is also applied to shutter mechanism 15 initiating exposure. Coupled to the shutter (not shown) of the shutter mechanism is an end-of-exposure detector 49 whose output is used for the purpose of returning mechanism 38 to its original state described above. In order for the pulse generator 39 to produce the proper number of pulses during the range pulse, the pulse repetition rate of the pulse generator must vary in accordance with the time-derivative of at least an approximation of the lens/subject function. This can be seen by considering the curve shown in FIG. 3 to which reference is now made.

A given objective contained in a lens mount establishes the lens/subject function relating the axial position of the lens mount at which a subject is in focus to the distance of the subject to the lens mount. A typical lens/subject function is illustrated in FIG. 3 by curve 50 where the ordinate and abscissa units are normalized for convenience. It should be understood that curve 50 is intended to represent the general shape of a typical lens/subject function, and is not drawn to scale. When the maximum permissible circle of confusion of the camera lens is specified, it is possible to compute the two curves identified by numerals 51 and 52 containing the curve 50 which take into account the depth of field for the lens system. For example, a subject located within the distance A defined by the intersection of the curves 51 and 52 with the ordinate line 0.4 M will be in focus when the lens mount is at the axial position 0.4 M. As indicated above, curves 51 and 52 are merely representative of the curves associated with an actual lens/subject function, and the distance A is only representative of a typical distance taking into account the size of the circle of confusion which is permitted by the designer. As a consequence of the existence of curves 51 and 52 in a given optical system, the actual lens/subject function can be approximated by a piece-wise linear curve designated by reference numeral 53. As long as this piece-wise linear curve or stepped approximation curve fits within the envelope of curves 51 and 52 a subject is said to be "in focus" since the lens position and subject distance intersect within the envelope defined by curves 51 and 52.

For a subject located a distance R from the lens mount, inspection of FIG. 3 reveals that the axial position of the lens mount should be a distance N from the terminal position of the lens mount corresponding to position I at which a subject closest to the lens mount will be in focus. Assuming that the range finding means of the camera produces a range pulse of duration $\tau$, it can be seen that the piecewise linear function designated by the curve 53 is parametrically related to time by reason of the functional relationship between the distance to the subject and time indicated by the curve 54 in the fourth quadrant of FIG. 3. Where the range finding means is an acoustic transponder, the slope of curve 54 will be proportional to the speed of sound in the medium within which the range finding means is operated.

Referring now to the curves shown in the third quadrant of FIG. 3, the staircase or stepped curve 55 represents the time-derivative of the piece-wise linear curve 53 shown in the first quadrant of FIG. 3. For example, curve 53 is linear between the origin and the distance 0.1D and has a slope of 4 within that interval. Thus, during the interval on the range-time axis of FIG. 3 corresponding to the range 0.1D, curve 55 has a value of 4 and is constant indicating that the slope in that interval is constant. Curve 56 represents the indefinite integral of curve 55 which of course has the same shape as curve 53 since the integral of the derivative of a function is the function itself.

As indicated in FIG. 3, a subject at a distance R from the lens mount will have associated with it a range pulse of duration $\tau$. By integrating curve 55 between the limits 0 and $\tau$, one will obtain a number proportional to the number N. The constant of proportionality chosen is k, the reciprocal of the specific displacement associated with the drive means and lens mount of a given camera. Integration of the output of a pulse generator whose pulse repetition rate varies in accordance with the time-derivative of curve 53 is accomplished by accumulating the pulses in a counter. Integration between definite limits $t=0$ to $t=\tau$ is accomplished by gating the input into the counter. As shown in FIG. 3, the cross-hatched area above curve 55 is the value of curve 56 at time $t=\tau$.

From the above, it can be seen that any lens/subject function can be approximated by a piece-wise linear curve using the constraints imposed upon the system by reason of the maximum circle of confusion permitted for the system. Furthermore, once a relationship is established between the distance of a subject from the lens mount and the characteristic of the range signal which directly relates the characteristic to the subject range, the time-derivative of the piece-wise linear approximation of the actual lens/subject function is known. The pulse repetition rate is scaled in accordance with the time derivative of the lens/subject function such that the number of pulses produced by the pulse generator at the end of a time interval associated with the distance to the subject will be representative of the axial position of the lens mount at which the subject will be in focus.

The curve 50 may be divided by any piece-wise linearization, and the pulse rate scaled for each. Hence, the pulse repetition is scaled in progressive steps, with each step corresponding to one of piece-wise linearizations of the actual lens/subject function.

Figure 4A:
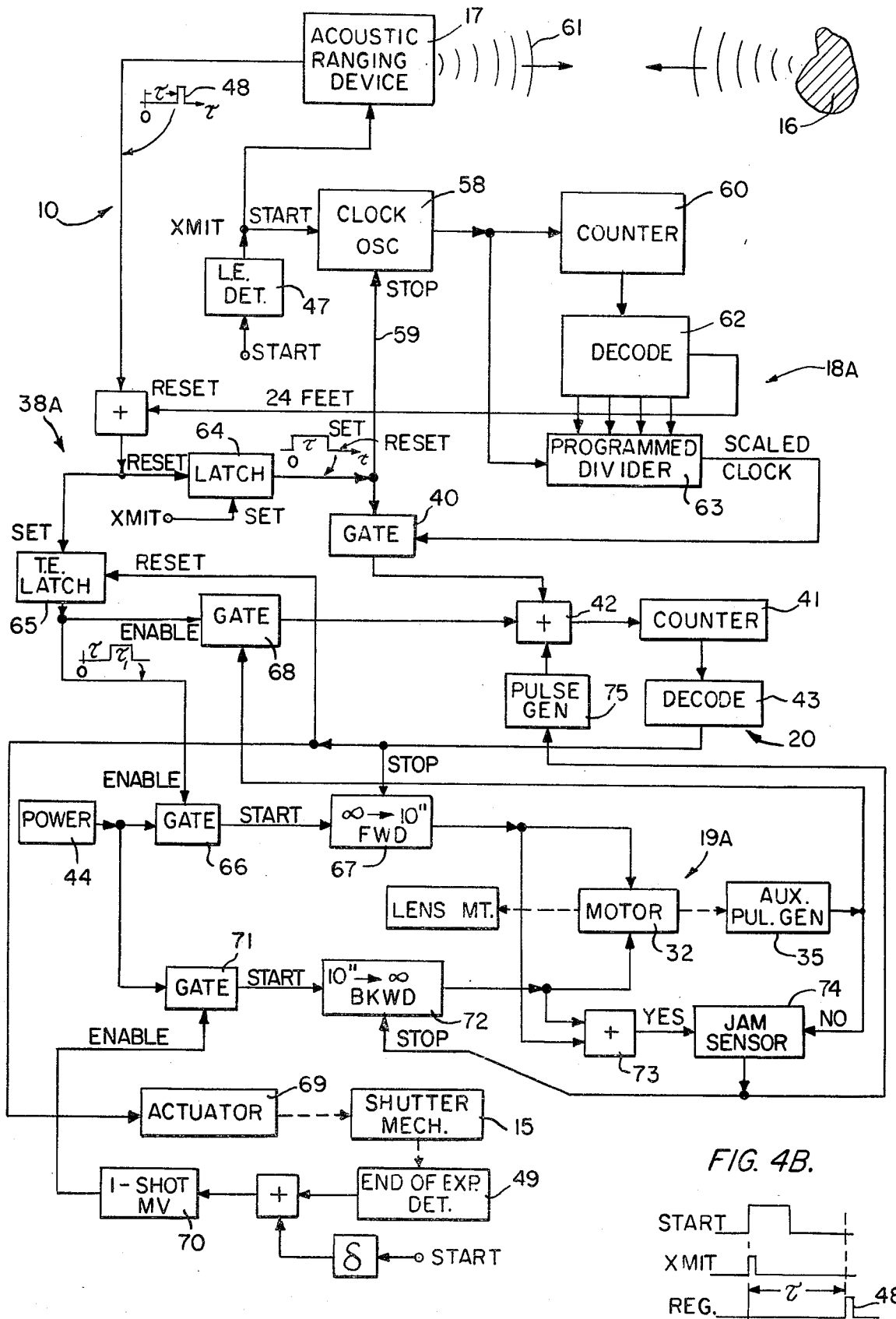
FIG. 4A is a detailed block diagram of the preferred embodiment of the automatic focusing snapshot camera shown in FIG. 1.

Reference is now made to FIG. 4A which shows the preferred embodiment of the present invention illustrating in more detail the principals illustrated in FIGS. 1–3. The automatic focusing camera 10 includes a manually keyable acoustic range finding means 17, and a power-operated focus mechanism 38A that includes pulse generator 18A and drive means 19A. In operation, a manual start signal applied to leading edge detector 47, such as the closing of a pushbutton, initiates a keying transmit signal to a clock oscillator 58 which continues to run until a stop signal is applied on line 59. The transmit signal also keys the acoustic range finding device 17 which responds by producing an outgoing wave 61 that is reflected back to the device 17 from a subject 16 after a period of time $\tau$, dependent on the range of the subject. The output of oscillator 58 is applied to a counter 60 whose contents are decoded at 62 in accordance with the breakpoints of the lens/subject function in order to change the number by which the output of oscillator 58 is divided by a programmed divider 63.

Figure 4B:
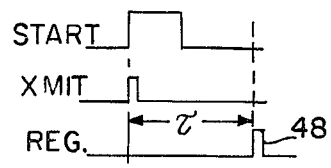
FIG. 4B is a waveform chart illustrating pulse arrangements formed in the circuit shown in FIG. 4A.

The pulse repetition frequency of the output of divider 63 decreases with time in accordance with the principals discussed in connection with FIG. 3. The output of divider 63 is termed the "scaled clock," and is applied to counter 41 through gate 40 and OR-gate 42. Gate 40 is held open (conductive) during the range pulse by reason of the operation of latch 64, which is set by the transmit signal of detector 47, and which is reset by the receive pulse 48 (FIG. 4B) furnished by range finder 17 a period of time $\tau$ subsequent to the transmit pulse. Consequently, for a subject located such that the lens mount 14 should be located a distance N from position II (see FIG. 1), kN pulses are supplied to counter 41 during the range signal defined by the period of time elapsed between the set and reset of the latch 64. Hence, the range pulse provides a distance parameter, and the oscillator 58, counter 60 and divider 63 as well as their gate controls provide means for converting the subject distance parameter to a lens parameter in accordance with the lens/subject distance function.

The receive pulse 48, in addition to acting on latch 64 and simultaneously shutting down oscillator 58, also sets trailing edge latch 65 to its "on" or operating condition (the latch 65 being held in this state until decoder 43 detects the number kM in counter 41). Latch 65 opens (enables) gates 66 and 68 during the time $\tau$ that it is set thereby respectively allowing power 44 to be applied to the forward motor control 67 and auxiliary pulses to be received. The former causes motor 32 to operate in a direction driving the lens mount from its infinity position II toward its close-up position I as indicated in FIGS. 2A and 2B. The rotation of motor 32 or of lens mount 14 also causes auxiliary pulse generator 35 to have an output that is applied by gate 68 to counter 41 through OR-gate 42.

Eventually, the auxiliary pulse generator 35 applies k(M-N) pulses to counter 41, whose contents will then be the number kM, allowing decoder 43 to reset latch 65 thus disabling gates 66 and 68. The output of decoder 43 also is applied to shutter actuator 69 which operates shutter mechanism 15 allowing exposure to take place. A detector 49, e.g., a switch arrangement, is employed to detect the end of exposure and its output is applied to a one-shot multivibrator 70 which in turn supplies a return-pulse of predetermined length to gate 71, to enable the latter thereby allowing power 44 to be applied to the backward control 72 of the motor. The duration of the pulse produced by multivibrator 70 is sufficiently long for motor 32 to drive the lens mount from position II to position I. In the normal course of events, the lens mount will reach the end of its travel before the return-pulse terminates to deenergize motor 32; and for this reason a slip clutch arrangement (not shown) is incorporated between the motor and the lens mount. As explained below, a jam sensor 74 is effective to shut down the reverse motor drive once the lens movement stops.

In the preferred embodiment, the initial lens mount position is slightly beyond the infinity position, e.g., rotated 10° beyond this point at which subjects at infinity are in focus. Since subjects located at 24 feet or further will be in focus when the lens is set at its hyperfocal distance of 30 feet, once the range pulse duration exceeds a predetermined time (representative of a subject at 24 feet) a signal is in effect substituted for the echo signal to thereby move the lens to its hyperfocal position. This is accomplished by the use of counter 60, since if the latter, whose contents are linerally related to time, reaches a count representative of 24 feet, there is no need to continue range conversion and decoder 62 produces a reset pulse that resets latch 64 allowing motor 32 to drive the lens mount to its 30 foot focus position.

In order to overcome a system malfunction, occurring subsequent to the manual start, resulting in no output from the end of exposure detector 49, the multivibrator 70 is triggered after a suitable delay within which the system would complete its operation if the malfunction had not occurred. Additionally for a malfunction occurring between the motor connection and the lens mount, power would be supplied to the motor without any rotation or displacement being given to the lens mount. This situation is protected against by utilizing an OR-gate 73 to which the outputs of foreward and backward drive controls 67 and 72 are applied. The output of this gate 73 and of auxiliary pulse generator 35 are applied to a jam sensor 74 which produces a jam signal when either of the controls 67 and 72 are operating under the condition that no pulses are being generated by the auxiliary pulse generator 35. When jam sensor 74 produces its jam signal output, gate 71 becomes enabled, gate 68 is disabled and pulse generator 75 is energized for the purpose of filling up counter 41 and causing actuator 69 to trip shutter mechanism 15.

The jam sensor 74 may take the form of a timing device, i.e., a conventional clock and counter which will be repeatedly reset by pulses from the auxiliary pulse generator 35. When lens movement stops and no further pulses are received, the jam sensor 74 counts to completion and emits its jam signal which is applied to both the pulse generator 75 to thereby fill up the counter 41 and thereby stop forward lens drive and to the backward drive control 72 to stop the latter.

For purposes of illustration, the outputs of the decoder 43 and the jam sensor 74 are illustrated as "stop" signals applied to motor controls 67 and 72, however, these signals may be conveniently applied as disable signals to gates 66 and 71 respectively. The jam sensor 74 may be gated into operation by the motor controls 67 and 72 or by gates 66 and 71. In normal operation, forward drive of the lens amount produces pulses which reset the jam sensor. Subsequently, the jam sensor is again reset by the backward drive of the lens mount. If, however, lens movement is not achieved, the jam signal shuts down the system.

Figure 14:
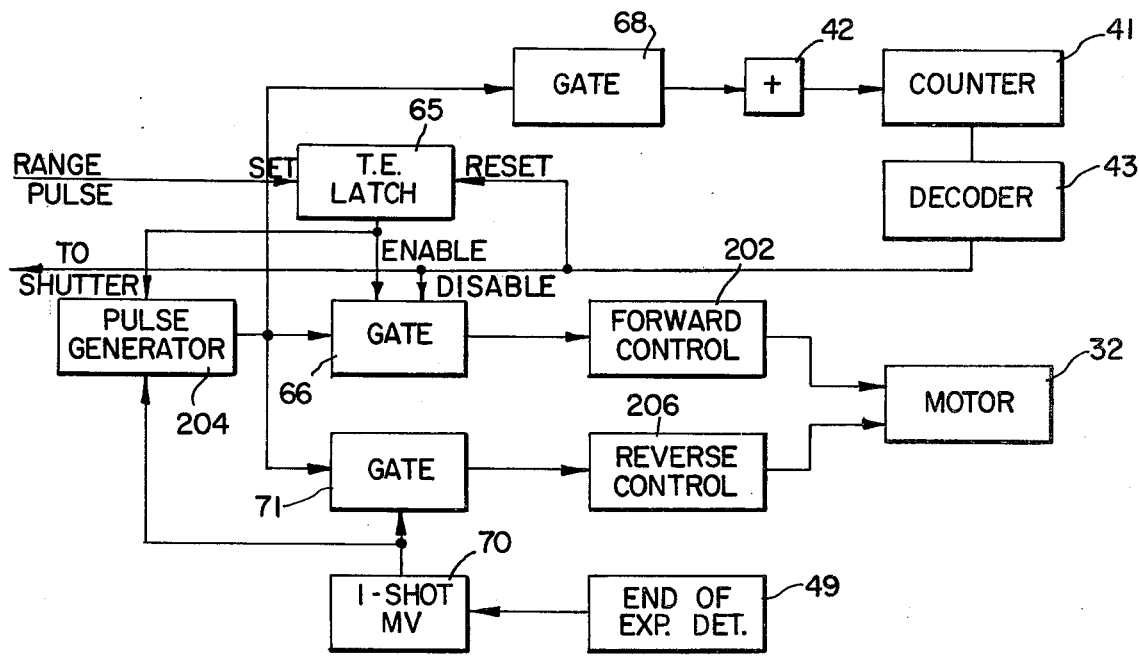
FIG. 14 is a block diagram of an alternate embodiment wherein a pulse system is employed to directly drive a stepper motor lens drive arrangement.

As indicated, the motor 32 shown in FIG. 4A is preferably a stepper motor. Consequently, the lens sensing may be eliminated and the motor driven in step with simulated lens pulses. For example, as shown in FIG. 14, pulses intended to fill the counter 41 may be provided from either the aforementioned auxiliary pulse generator 35 or a separate generator and fed directly to the motor 32. In this arrangement the trailing edge latch 65 enables the gate 66 to set a forward control circuit 202 and activates a pulse generator 204. The latter feeds pulses to both the motor 32 and the counter 41. When the decoder 43 trips, the gate 66 is disabled and the motor drive stops. Following exposure, the multivibrator 70 enables the gate 71 and again activates the pulse generator 204 to drive the motor in reverse in accordance with reverse control 205.

Another embodiment of an automatic focusing mechanism is illustrated in FIG. 5A by reference numeral 38B. Gated pulse generator 80, which operates in the manner described above, responds to a range pulse by producing kN pulses which are accumulated in counter 81. The contents of this counter are thus representative of the axial position of the lens mount for the subject to be in focus. The range pulse is also applied to a trailing edge detector latch 82 which opens (enables) gate 83 at the end of the range pulse allowing power source 84 to be applied to motor 85. This motor drives lens mount 86 from its initial position (i.e., position I as shown in FIG. 5B), toward position II. In addition, the motor causes auxiliary pulse generator 87 to produce a train of pulses functionally related to the axial displacement of the lens mount in the manner previously described. The pulses from pulse generator 87 are accumulated in counter 88 whose contents are continuously compared with the contents of counter 81 by means of comparator 89.

When the contents of counters 81 and 88 reach equivalence, i.e., when auxiliary pulse generator 87 has produced kN pulses, the output of comparator 89 resets latch 82 when closing (disabling) gate 83 and de-energizing motor 85. Thus, in the interval $\tau$, following the range pulse, the motor will have driven lens mount 86 to an axial position at which the subject will be in focus.

A further embodiment of the focusing mechanism according to the present invention is shown in FIG. 6A, and is designated by reference numeral 38C. Mechanism 38C includes a gated pulse generator 80 which produces kN pulses in response to the application of a range pulse. These pulses are applied to up/down counter 90 through OR-gate 91. The direction of counting of counter 90 is determined by the relative levels at terminals 92, 93. The range pulse is applied simultaneously to leading edge detector 94 and trailing edge detector 95 such that a signal is applied to "up" counting terminal 92 coincident with the leading edge of the range pulse, and a signal is applied to "down" terminal 93 by detector 95 coincident with the trailing edge of the range pulse. Thus, the range pulse initially causes the pulses kN derived from generator 80 to be added in counter 90. The range pulse is also applied to the trailing edge latch 96 which is set by the trailing edge of this pulse thus enabling gate 97 and applying power source 98 to motor 99 which moves lens mount 100 from position I as shown in FIG. 6B towards position II. As the motor drives the lens mount axially, auxiliary pulse generator 101 produces a train of pulses which are applied to counter 90 through OR-gate 91. However, just before these pulses are applied to the counter, the trailing edge of the range pulse will have caused detector 95 to switch the direction of counting of counter 90, and the pulses produced by generator 101 will be subtracted from the accumulated count in counter 90. Decoder 102 senses when the counter 90 reaches zero and resets latch 96 thereby disenabling gate 97 and removing power from motor 99. Consequently, generator 101 will have produced kN pulses as the lens mount is moved to an axial position at which the subject will be in focus.

Figure 7:
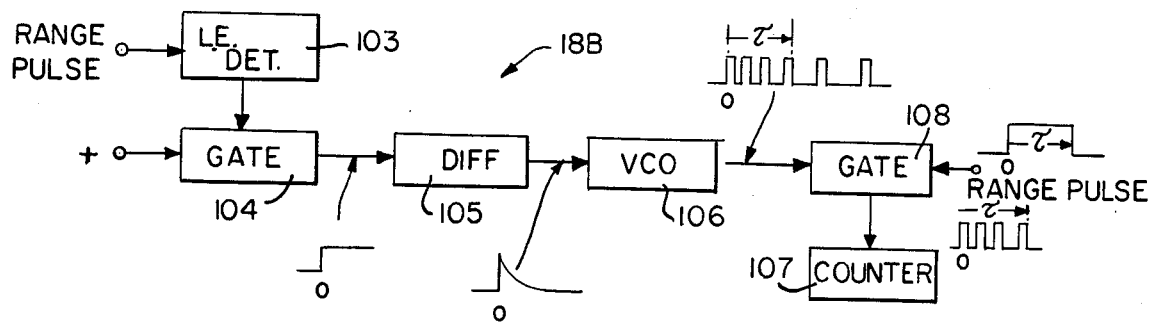
FIG. 7 is a further embodiment of the power-operated focusing mechanism according to the present invention utilizing a voltage controlled oscillator as a pulse source.

Another embodiment of the pulse generator means is shown in FIG. 7 and is designated by reference numeral 18B. In this embodiment, leading edge detector 103 detects the leading edge of the range pulse and opens (enables) gate 104 applying a step function to differentiator circuit 105. The parameters of circuit 105 are selected such that the exponentially decaying output of the circuit closely matches the time-derivative of the actual lens/subject function. The variable voltage input to voltage controlled oscillator 106 causes the output of this device to produce a train of pulses whose repetition rate varies in accordance with the output of differentiating circuit 105. The train of pulses produced by oscillator 106 is gated into counter 107 through a gate 108 whose conduction of transmission time is controlled by the range pulse. As a consequence, the number of pulses accumulated in counter 107 will be a measure of the axial position of a lens mount at which a subject will be in focus. Counter 107 could be used with the arrangements shown in FIGS. 5A and 6A, for example, to properly position a lens mount.

Figure 8:
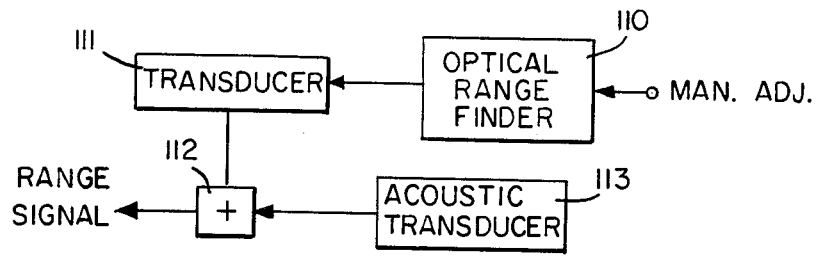
FIG. 8 is a simplified block diagram showing how a manually operated range finding means can be incorporated into an automatic focusing camera according to the present invention.

Referring now to FIG. 8, an arrangement is shown for generating a range signal manually or automatically. This arrangement includes an optical range finder 110 providing an analog input to transducer 111 in response to the manual setting of the optical range finder to a condition at which the subject being photographed is in focus. The output of transducer 111 converts the range of the subject to a range signal having a characteristic directly proportional to the subject range. The output of transducer 111 is applied to pulse generator means of the type described above through OR-gate 112. The other input to this OR-gate is an acoustic transducer 113 of the type described above. With this arrangement, the focusing of the lens mount of a camera is mechanized using the circuits described above while providing the flexibility of using either a conventional optical range finder or an acoustic transducer.

In the preferred embodiment of FIG. 4A, the conversion from the linear range signal to the nonlinear lens position is accomplished by the scaled clock arrangement prior to lens operation. However, this conversion may be provided in the lens feedback loop as illustrated in FIG. 11, wherein a lens mount 158 carries a slotted disc 159 which in conjunction with a light source 36 and a photocell 37 form an auxiliary pulse generator or lens position sensor similar to that described with respect to FIGS. 2A and 9.

Contrary to the previously described embodiments, the disc 159 is not uniformly slotted but rather includes a plurality of slots 160 which are spaced at progressively decreasing spacing along the disc perimeter to provide a nonlinear lens position sensor corresponding to relationship of lens position versus subject distance. Hence, in this embodiment each lens or drive pulse is equal to a lens displacement required per unit change in subject distance.

In operation, as the lens sleeve 158 is driven from its illustrated terminal position (slightly beyond its infinity position) counterclockwise as viewed in FIG. 11, the number of slots passing the light source for each unit angle of revolution continually increases at a rate following the lens/subject curve 50 of FIG. 3. A linear range signal to drive pulse arrangement may then be employed with one to one correspondence to the feedback pulses. For example, in the embodiment illustrated in FIG. 4A, the scaled clock 63 would be eliminated and uniformly spaced pulses fed directly to the counter 41 during the ranging operation.

Figure 13:
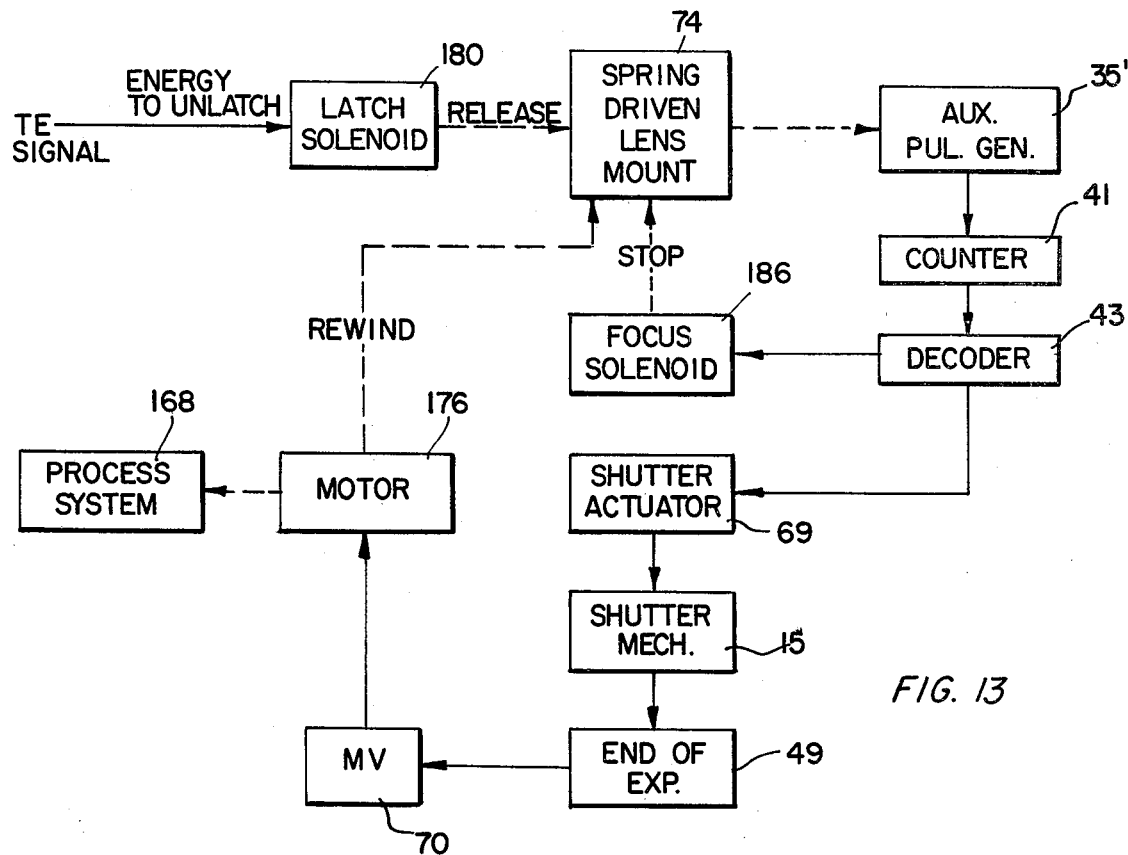
FIG. 13 is a block diagram of an automatic focusing system employed in conjunction with the lens drive arrangement of FIG. 12.

A solenoid controlled lens drive arrangement 166 which is recocked in conjunction with operation of a film processing station 168 is illustrated in FIGS. 12 and 13. As shown therein, a lens drive disc 170 carries a plurality of slots 172 which form part of a lens position sensor or auxiliary pulse generator as in the preferred embodiment.

The disc 170 is biased in a counterclockwise direction as viewed in FIG. 12 by means of a spring (not shown). During processing, as explained below, a dc motor 176 also drives the disc (and the lens 14) in a clockwise direction, to recock the disc against the bias of the spring 174. A latch solenoid 180 by means of its latch arm 181 pivotally mounted at 183 captures and holds the disc 170 in its recocked position upon engagement of arm 181 with a stud 182. A rack arrangement 184 carried on the periphery of the disc 170 cooperates with a focus solenoid 186 to stop the lens in the proper focus position as described below in detail with regard to FIG. 13. Energization of the focus solenoid 186 rotates its arm 187 around pivot point 189 for disc engagement.

As previously indicated, the lens drive system 166 is operated in conjunction with a processing station 168 such as is often employed in so called "self-developing" cameras. In such cameras, following exposure the film unit is advanced between pressure applying members, for example, rollers 190 and 192 which operate to spread developing fluid across portions of the film material. Preferably one of the rollers 190 is rotated during this operation by the motor 176 through a gear train 194.

Additionally, the lens disc 170 is also driven to its recocked position shown in FIG. 12, by means of a second gear train 196; the latter including a clutch 198 which permits continued operation of the motor 176 once the lens mount 14 reaches its terminal position.

Turning now to FIG. 13, the operation of the above described solenoid controlled lens drive will be explained with regard to the ranging and scaled counting arrangement of FIG. 4A. Assuming that during the range pulse of FIG. 4A the counter 41 is partially filled thereby representing the desired lens position, the trailing edge signal (coincided with the echo signal) stops further range counting pulses from entering counter 41 and energizes the latch solenoid 180. This releases the spring driven lens mount 14 such that the disc 170 and the lens mount 14 rapidly spins in a counterclockwise direction which displaces the lens from its terminal position towards a close up focal position. As the lens rotates, the counter 41 is rapidly filled by the auxiliary generator 35. When the counter 41 becomes filled, decoder 43 trips thereby energizing focus solenoid 186; the latter, in turn, engaging and stopping disc rotation so that the system is focused.

As shown, the decoder 43 also initiates shutter operation, however, the latter could be derived from the focus solenoid actuation such as by means of a switch coupled to the arm 187. Once the exposure is completed, an end of exposure detector 49 starts the motor 176 which processes the film and at the same time rewinds the lens assembly to its cocked position.

While the above drive system is illustrated and described as a motor driven device, it lends itself to manually recocking with the latter being provided by manual processing or separately thereof.

Advantageously, the embodiments described above when employed in still (snap-shot type) cameras may initiate actuation of the shutter in response to arrival of the lens mount to a position at which the subject is in focus. Since a relatively long period of time generally elapses between each manual input to the range finder, this allows sufficient time for the lens mount to be driven back to a known start position which simplifies the logic since there is no need to remember the last position of the lens mount at which a previous subject had been in focus. By expanding the amount of logic, however, it is possible to incorporate a memory into the circuitry so that the start position of the lens mount for a given focusing operation will be in the just previous position of lens. The availability of a memory of this type permits the present invention to be expanded as discussed below into use with a movie camera in which the shutter mechanism is operated continuously over a period of time, and the lens mount must be adjusted during this period in the event the subject distance changes.

Figure 10A:
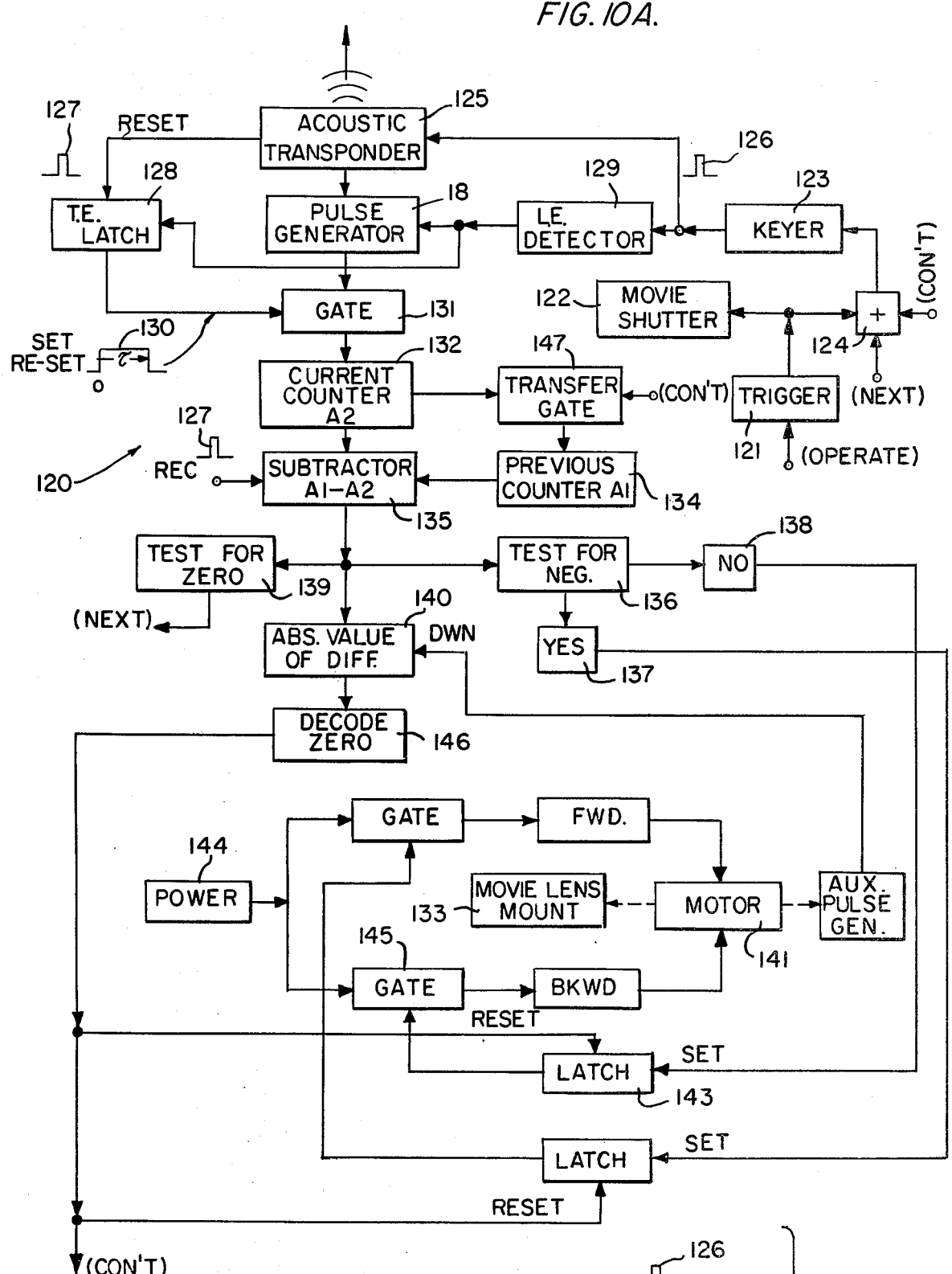
FIG. 10A is a detailed block diagram of an automatic focusing movie camera according to the present invention.
Figure 10B:
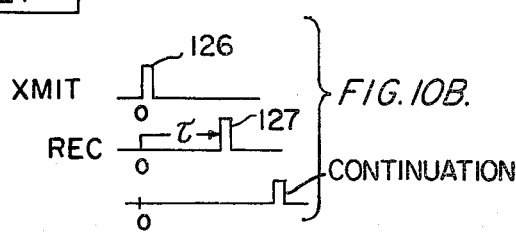
FIG. 10B is a waveform diagram associated with the block diagram of FIG. 10A.

An automatic focusing mechanism for a movie camera is illustrated in FIG. 10A and is designated by reference numeral 120. In response to the manual setting of trigger 121 of the camera, the movie shutter 122 begins to operate in a conventional manner, and continues as long as trigger 121 remains set. When manually reset, trigger 121 halts operation of the shutter. The setting of trigger 121 is applied to keying circuit 123 through OR-gate 124 causing circuit 123 to transmit pulse 126 that is applied to acoustic transponder 125. In response to the application of pulse 126, transponder 125 transmits an interrogation pulse toward a subject being filmed. The echo from the subject is received by transponder 125 and converted to an echo pulse 127 (see FIG. 10B) which is applied to trailing edge latch 128, resetting the same a time $\tau$ following the setting of this latch by the output of leading edge detector 129 which detects the occurrence of pulse 126 produced by keyer 123. As a consequence, latch 128 produces a range pulse, designated by reference numeral 130, which enables gate 131 during the existence of this pulse to gate the output of pulse generator means 18 into "current" counter 132. The contents (A2) of counter 132, at the termination of the range pulse, is representative of the position that movie lens mount 133 should be moved in order for the subject being filmed to be in focus. At this point, the contents (A1) of "previous" counter 134 is representative of the actual position of lens mount 133. When subtractor 135 is operated in response to receive pulse 127, subtractor 135 will subtract the contents of counter 132 from the contents of counter 134 and thereafter contain a number whose magnitude is representative of the distance that the lens mount must move to bring the subject being filmed into focus, and whose sign is indicative of the direction in which the lens mount must be moved. The sign of the contents of subtractor 135 is determined by circuit 136. A negative sign is detected by circuit 137 indicating that the motor should move in one direction; and a positive sign is detected by circuit 138 indicating that the motor should move in the opposite direction. The number in subtractor 135 is also tested by circuit 139 to determine whether the number is zero since the subject may already be in focus. If the number in subtractor 135 is not zero, its absolute value is transferred into register 140 in preparation for the movement of the lens mount 133 by motor 141. Such movement causes the pulses produced by the auxiliary pulse generator 142 to count down the contents of register 140.

If the sign of the number in subtractor 135 is such that latch 143 is set (thereby enabling gate 145) by circuit 138 causing the motor 141 to run backwards as power 144 is applied through gate 145 to the motor, rotation of the motor drives the lens mount toward a position at which the subject being filmed will be in focus. The resetting of latch 143 (thereby disabling gate 145), when circuit 146 detects the presence of zero in register 140, stops the motor with the lens mount at that point being at a position at which the subject is in focus. The opposite situation occurs if the sign of the number in subtractor 135 is negative.

When the lens mount has reached its proper position, indicated by an output from decoder 146, a "continuation" pulse is produced which is applied to keying circuit 123 through OR-gate 124 causing circuit 123 to produce another transmit pulse, and the cycle described above is repeated, providing that trigger 121 is still set. In addition, the "continuation" pulse also enables transfer gate 147 which is effective to transfer the contents of current counter 132 into previous counter 134.

In the event that the lens mount is already positioned for the subject to be in focus, the number in subtractor 135 will be zero and the circuit 139 will produce a "next" pulse which will be applied to keying circuit 123 which will produce another transmit pulse in response.

Shutter 122 remains operating as long as trigger 121 remains set, and transponder 125 is keyed periodically independently of the operation of the shutter. The rate at which transponder 125 is keyed depends only on the time required to drive the lens mount from one position to the next in synchronism with changes in range of the subject. Such time is relatively small, and is measured in terms of milliseconds thus insuring that the subject being photographed will remain in focus during filming.

It is believed that the advantages and improved results furnished by the apparatus of the present invention are apparent from the foregoing description of the several embodiments of the invention. Various changes and modifications may be made without departing from the spirit and scope of the invention as sought to be defined in the claims that follow.

What is claimed is:

1. In a camera having variable means for focusing image forming rays from a subject on the camera focal plane, the specific variation of said focusing means at which a subject is in focus being a predetermined nonlinear function of subject distance, and having range finding means for generating a range parameter representative of subject distance, said range parameter being a timed duration thereby establishing a relationship between subject distance and time, the improvement comprising:

means responsive to said range parameter for generating a train of pulses whose number is representative of the specific variation of said focusing means at which said subject will be in focus, said pulse generating means including a counter for accumulating said pulses of said pulse train and a pulse generator with a preprogrammed time-variable pulse repetition rate, said preprogrammed repetition rate of said pulse generator being such that the contents of said counter, at the end of said range pulse, is representative of the specific variation of said focusing means at which said subject will be in focus; and means for varying said focusing means in accordance with the total number of pulses in said train of pulses, said focus ranging means including means responsive to said end of said timed duration for varying said focusing means in accordance with the contents of said counter.

2. The improvement of claim 1 wherein said pulse rate of said pulse generator varies, in accordance with the time-derivative of at least an approximation of said predetermined function.

3. The improvement of claim 1 including means for periodically causing said range-finding means to generate a range parameter.

4. In a camera having variable means for focusing image forming rays from a subject on the camera focal plane, the specific variation of said focusing means at which a subject is in focus being a predetermined non-linear function of subject distance, and having range finding means for generating a range parameter representative of subject distance, the improvement comprising:

means responsive to said range parameter for generating a train of pulses whose number is representative of the specific variation of said focusing means at which said subject will be in focus, said pulse generating means including a variable repetition rate preprogrammed in accordance with the time derivative of at least an approximation of said lens/subject function, said pulse generating means including a variable pulse generating rate preprogrammed in a series of successive steps, with each successive step having a constant rate different from adjoining steps; and means for varying said focusing means in accordance with the total number of pulses in said train of pulses.

5. In a camera having a lens mount displaceable through a distance M between a pair of terminal positions with the distance from one terminal position to a location at which a subject at range R is in focus being defined as the distance N, said distance N being a predetermined function of R, and having range-finding means for generating a range signal whose timed duration is directly proportional to R thereby establishing a relationship between R and time, the improvement comprising:

pulse generator means responsive to the start of a range signal for generating a train of pulses whose repetition rate varies during said range signal as the time-derivative of at least an approximation of the function relating N to R;

a first counter for accumulating pulses from said pulse generator means during said range signal whereby the total number of pulses transmitted to said first counter is kN where k is a constant; and drive means for displacing said lens mount in accordance with the contents of said first counter.

6. The improvement of claim 5 wherein said drive means includes:

means for displacing said lens mount from an initial terminal position in one direction;

an auxiliary pulse generator generating a train of pulses whose number is k times the axial displacement of said lens mount; and logic means responsive to the output of said auxiliary pulse generator and to the contents of said first counter for disabling said displacing means after it has displaced said lens mount from said initial terminal position to a distance N from said one terminal position.

7. The improvement of claim 6 wherein said initial terminal position of said lens mount is opposite said one terminal position, and said logic means includes means for transmitting the output of said auxiliary pulse generator into said first counter, and a decoder for determining when said first counter reaches the number kM and in response thereto for disabling said displacing means, whereby said lens mount is displaced from its said initial terminal position through a distance (M-N) toward said one terminal position.

8. The improvement of claim 6 wherein said first counter is an up/down counter having an initial state, and wherein said logic means includes means responsive to said range signal for causing said up/down counter to count in one direction when said range signal starts and to count in the opposite direction when said range signal ends, means for gating the output of said auxiliary pulse generator into said up/down counter, and a decoder for detecting when said up/down counter reaches its said initial state and responsive thereto for disabling said displacing means whereby said lens mount is displaced from its said one position through the distance N toward the opposite terminal position.

9. In a camera having a shutter mechanism, and having a lens mount with a predetermined lens/subject function that relates the axial position of the lens mount at which a subject is in focus to the distance to the subject, the improvement comprising:

keyable range finding means having an acoustic transponder for ascertaining the distance to a subject and responsive to keying for generating a range pulse whose duration is directly related to the subject distance thereby establishing a relationship between subject distance and time;

a pulse generator with a programmed time-variable pulse repetition frequency responsive to the start of the range pulse for generating a train of pulses whose repetition rate varies as the time-derivative of at least an approximation of the lens/subject function;

counter means for accumulating the pulses produced by said pulse generator during said range pulse duration; and drive means for displacing said lens mount in accordance with the contents of said counter.

10. The improvement of claim 9 including means responsive to displacement of said lens mount to a position corresponding to the contents of said counter for actuating said shutter mechanism.

11. The improvement of claim 9 including means for periodically actuating said shutter mechanism independently of the keying of said range finding means.

12. The improvement of claim 9 including means for periodically keying said range finding means independently of the actuation of the shutter mechanism.

13. The improvement of claim 9 including means for subsequent keying of said range finding means responsive to the end of a preceding range pulse.

14. An automatic focusing camera having a shutter mechanism, said camera comprising:
a displaceable lens having a predetermined lens/subject function that relates the position of said lens, at which a subject is in focus, to the subject distance;
means responsive to keying for generating a range pulse whose duration is directly related to the distance of a given subject;
pulse generator means including a pulse generator with a programmed time-variable pulse repetition frequency, and a counter for accumulating pulses of said pulse generator, the programmed repetition rate of said pulse generator varying with time in accordance with the time derivative of at least an approximation of said predetermined lens/subject function, whereby the contents of said counter, at the end of said range pulse, is representative of the axial position of said lens at which said given subject will be in focus; and
drive means actuatable for displacing said lens in accordance with the contents of said counter.

15. An automatic focusing camera according to claim 14 wherein said means for generating said range pulse includes an acoustic transponder, and said camera includes means for keying the acoustic transponder to produce successive range pulses at a frequency whose period exceeds the duration of each of said range pulses produced by said transponder, and means for enabling the operation of said drive means in response to termination of each of said range pulses.

16. An automatic focusing camera according to claim 14 including means responsive to the end of a given range pulse for subsequently actuating said shutter means.

17. An automatic focusing camera according to claim 14 including decoder means for sensing when said lens is displaced to a given position corresponding to said contents of said counter, means responsive to displacement of said lens to said given position for resetting said counter, and means for actuating said resetting means under the condition wherein said drive means is operating without displacement of said lens.

18. An automatic focusing camera comprising:
means for defining a focal plane;
an objective lens;
means for mounting said lens for movement to respective focal positions wherein subjects at various distances from said camera are in focus at said focal plane, said focal positions of said lens being related to said subject distances by a predetermined non-linear lens/subject function;
means for providing a subject range parameter as a linear function of subject distance;
means for converting said range parameter to a lens parameter related to a focal position in a series of successive linear steps approximately said non-linear lens/subject function, said converting means including a pulse generator for producing a train of pulses and means for storing said pulses, said pulse generator being programmed at a different pulse repetition rate for each of said successive steps, said lens parameter being the total number of stored pulses; and
means actuatable for displacing said lens to a focal position in accordance with said lens parameter, said displacing means including means for displacing said lens a fixed amount for each stored pulse.

19. A process of focusing a photographic camera comprising the steps of:
propagating at least one pulse of energy at the subject to be photographed;
timing the difference between the start of said propagation and the return of an echo signal from said subject;
forming and storing pulses during said timing step at successive scaled rates providing linear steps approximating the relation between lens position and subject distance such that the number of stored pulses is representative of the lens position at which said subject is in focus; and
displacing said lens to a focal position corresponding to the number of pulses stored during said forming and storing step.

20. In a camera having a displaceable lens for focusing image carrying rays from a subject on the camera focal plane, the position of said lens at which a subject is in focus being a predetermined non-linear function of subject distance, and having range finding means for generating a range parameter representative of subject distance, the improvement comprising:
a first pulse generator responsive to said range parameter for generating a train of pulses whose number is representative of subject distance;
means for converting displacement of said lens to a linear focus parameter, said converting means including a second pulse generator coupled to said lens for producing upon displacement thereof a train of pulses whose number is representative of the position of said lens at which a given subject distance is in focus, said second pulse generator having a variable pulse repetition rate preprogrammed to provide a pulse for each displacement of said focusing means required per unit change in subject focus;
means for displacing said lens; and
means for evaluating the total number of said pulses in said pulse train and said pulses produced by said second pulse generator and for terminating displacement of said lens when said pulse generator produces a pulse count indicating that said lens is positioned in accordance with said range parameter.

21. The camera of claim 20 wherein said lens is mounted for rotation so as to displace said lens for focusing and said second pulse generator includes a circular member mounted for rotation in synchronism with said lens, and means mounted at progressively varied spacing around the circumference of said member for cooperating with said camera to produce said preprogrammed pulses in response to lens rotation.

22. In a camera having a displaceable lens for focusing image carrying rays from a subject on the camera focal plane, the position of said lens at which a subject is in focus being a predetermined non-linear function of subject distance, and having actuatable range finding means for generating a linear range parameter of timed duration representative of subject distance, the improvement comprising:
   means responsive to said range parameter for generating a train of pulses whose number is representative of the position of said lens at which said subject will be in focus, said pulse generating means including a first counter for accumulating said pulses of said pulse train and a pulse generator with a time-variable pulse repetition rate preprogrammed to approximate said non-linear function such that the contents of said first counter, at the end of said range pulse, is representative of the position of said lens at which said subject will be in focus;
   means indicative of the just previous position of said lens assembly, said indicative means including a second counter whose content is representative of said previous position of said lens assembly;
   means for determining the difference in content between said first and second counters; and
   means for displacing said lens in accordance with said difference in content between said counters so as to position said lens in accordance with said range parameter.

23. The camera of claim 22, wherein said pulse generator is preprogrammed in a series of successive steps approximating said non-linear function, and said pulse generator provides a different pulse rate for each successive step.

24. The camera of claim 23 including means for subsequently actuating said range finding means to provide a subsequent range parameter and means for transferring the contents of said first counter to said second counter following initial operation of said difference determining means whereby said contents of said second counter become representative of the position to which said lens is moved responsive to an initial range parameter and of the previous position with respect to the next subsequent range parameter.

25. The camera of claim 22 wherein said displacing means is responsive to generation of said range parameter and including means for periodically actuating said range finding means to periodically produce successive range parameters.

26. In a camera comprising a variable focus lens assembly having a lens portion displaceable for focusing of subjects on the camera focal plane, said lens portion being displaceable within a given range of first to last positions, means for producing a first plurality of pulses whose number is representative of a desired lens position proceeding from said first to said last position, drive means for displacing said lens portion in a direction proceeding from said first to said last position and for producing a second plurality of pulses whose number is representative of the actual position of said lens portion, and means for counting said first and second plurality of said pulses and for terminating said displacement of said lens portion when the counted pulses is representative of the number of positions in said given range of positions.

27. The apparatus of claim 26 additionally including range finding means for determining the distance from said camera to a subject, said means for producing said first plurality of pulses being responsive to said range finding means for producing a plurality of pulses representative of said subject distance, and said drive means comprises means for displacing said lens from a far focus position toward a close up focus position.

28. The apparatus of claim 26 wherein said counting and terminating means includes a counter for storing and summing said pulses, a decoder for producing a signal when the stored count is equal to the number of said positions, and means responsive to said decoder signal for terminating said displacement.

29. Apparatus for automatically displacing an operational member to selected positions within a given range of first to last positions, said apparatus comprising means for producing a first plurality of pulses whose number is representative of said selected position proceeding from said last to said first position, drive means for displacing said member in a direction proceeding at least from said first toward said last position and for producing a second plurality of pulses whose number is representative of the actual position of said member, and means for counting said first and second plurality of said pulses and for terminating said displacement of said member when the number of counted pulses is representative of the number of positions in said given range.

30. The apparatus of claim 29 additionally including range finding means for determining the distance to a selected point, and said means for producing said first plurality of pulses is responsive to said range finding means for producing a plurality of pulses whose number is representative of said distance.

31. The apparatus of claim 29 wherein said counting and terminating means includes a counter for storing and summing said pulses, a decoder for providing a signal when the stored count is equal to the number of said positions, and means responsive to said decoder signal for terminating said displacement.

* * * * *